United States Patent [19]

Ogawa et al.

[11] Patent Number: 4,762,202
[45] Date of Patent: Aug. 9, 1988

[54] ELASTIC ENERGY STORING DEVICE

[75] Inventors: Masahiro Ogawa, Toyoake; Akio Fukui, Toyota, both of Japan

[73] Assignee: Toyota Jidosha Kabushiki Kaisha, Aichi, Japan

[21] Appl. No.: 72,736

[22] Filed: Jul. 13, 1987

[30] Foreign Application Priority Data

| Jul. 18, 1986 | [JP] | Japan | 61-168033 |
| Sep. 19, 1986 | [JP] | Japan | 61-142712[U] |
| Oct. 1, 1986 | [JP] | Japan | 61-149488[U] |
| Dec. 12, 1986 | [JP] | Japan | 61-190504[U] |
| Dec. 12, 1986 | [JP] | Japan | 61-190505[U] |
| Dec. 15, 1986 | [JP] | Japan | 61-191700[U] |
| Jan. 30, 1987 | [JP] | Japan | 62-18461 |

[51] Int. Cl.$^4$ .................................................. F03G 1/00
[52] U.S. Cl. ........................................ 185/39; 185/37; 185/43
[58] Field of Search ............................ 185/37, 39, 43

[56] References Cited

U.S. PATENT DOCUMENTS 1,820,967  9/1931  Enyeart ............................ 185/37
3,308,907  3/1967  Bodkin ............................. 185/39

FOREIGN PATENT DOCUMENTS 49-96144   9/1974  Japan .
61-41649   2/1986  Japan .
61-38363   3/1986  Japan .
61-38364   3/1986  Japan .
61-38365   3/1986  Japan .
61-38360   3/1986  Japan .
61-38361   3/1986  Japan .
61-38362   3/1986  Japan .

*Primary Examiner*—Allan D. Herrmann
*Attorney, Agent, or Firm*—Kenyon & Kenyon

[57] ABSTRACT

An energy storing device comprises a first drum, a second drum and at least one intermediate drum, an elastic cord wound from the first drum to the second drum via the intermediate drum, and means for mechanically connecting the drums so that the peripheral displacement of the second drum is greater than that of the intermediate drum and that of the intermediate drum is greater than that of the first drum. By providing the at least one intermediate drum, energy output from the device can be obtained even if the initial strain of the elastic cord is zero, and high energy output efficiency can be obtained in comparison with conventional one drum and two drum devices.

22 Claims, 12 Drawing Sheets

ELASTIC ENERGY STORING DEVICE

BACKGROUND OF THE INVENTION

1. Field of the Invention

The present invention relates to an energy storing device capable of storing energy and discharging the stored energy by utilizing an elastic deformation of an elastic body. More particularly the present invention relates to an energy storing device wherein elastic strain energy is stored in a stretched elastic cord wound on a drum.

2. Description of the Prior Art

Energy storing devices which can store energy by utilizing an elastic deformation of an elastic cord are disclosed in Japanese utility model publications Nos. SHO 61-38360, SHO 61-38361, SHO 61-38362, SHO 61-38363, SHO 61-38364 and SHO 61-38365, and Japanese patent publication No. SHO 61-41649 etc.

The approximate arrangement and function of the conventional energy storing devices disclosed in the above publications are explained with reference to FIGS. 23 and 24. An energy storing device 1 has a drum 2. An elastic cord 3 spirally wound on the drum 2 has one end fixed on the drum 2 and the other end fixed on a frame 4. A torque transmission device 5 driven by an engine 6 of an automobile is connected to drum 2 via a clutch 7. During engine deceleration, clutch 7 engages, the rotation of torque transmission device 5 rotates drum 2, thereby winding elastic cord 3 on the drum 2. Because the other end of the cord is fixed to frame 4, the cord stretches, and elastic strain energy is stored in the stretched elastic cord 3 wound on the drum 2. When a sufficient amount of elastic strain energy is stored, clutch 7 disengages, stopping the rotation of drum 2. When engine 6 is started or accelerates, clutch again engages, drum 2 is reversely rotated by the wound elastic cord 3, and elastic strain energy stored in the elastic cord 3 is discharged. The discharged energy is utilized to assist accelerating or starting of th automobile.

In the above energy storing device 1, elastic cord 3 is wound on drum 2 via carrier 8, as shown in FIG. 24. The carrier 8 permits wound elastic cord 3 to move freely along the periphery of the drum 2 in the circumferential direction. Therefore, when elastic cord 3 is stretched and wound on the drum 2, the strain of the elastic cord 3 occurs over the entire length of the elastic cord 3.

However, when the peripheral displacement due to the rotation of drum 2 becomes large, the tension of elastic cord 3 also becomes large and places a large load on the drum. Accordingly, the energy storing device 1 must be strong and rigid to endure the large load, causing the device to be large and heavy. Such a structure increases the cost of the device, and adds to the weight of a vehicle, thereby reducing fuel economy when the device is applied to the vehicle.

In another type of elastic energy storing device, the entire length of the elastic cord is not strained uniformly but a part of the elastic cord is strained to a great and constant extent, the strained portions of the elastic cord are wound on a drum continuously, the proportion of the strained and wound portions of the elastic cord is gradually increased, and the elastic strain energy is stored in the strained elastic cord wound on the drum. Such a device is disclosed in, for example, Japanese patent publication No. SHO 49-96144. Such a device can be prevented from having a large-sized and heavy-weight structure. The device disclosed in Japanese patent publication SHO No. 49-96144 is shown in FIG. 25. The device has two drums 9 and 10, an elastic cord 11 is wound between drums 9 and 10, and drums 9 and 10 are rotated in the same direction via pulleys 12 and 13 and belt 14. A similar device shown in FIG. 26 has substantially the same function as the device disclosed in Japanese patent publication No. SHO 49-96144. In FIG. 26, two parallel drums 15 and 16 having different diameters have an elastic cord 17 extended obliquely between them and are mechanically connected by gears 18 and 19 so as to rotate in opposite directions.

In devices having two drums, as shown in FIGS. 25 and 26, if the initial strain of the elastic cord wound onto the smaller diameter drum (drum 9 or 15) is zero, the discharged energy becomes zero and output efficiency of the device becomes zero. (The reason is described later.) Therefore, if a cord having poor elasticity is used, there occurs a problem that the output energy becomes almost zero because not enough initial elastic strain can be taken.

SUMMARY OF THE INVENTION

An object of the present invention is to provide an elastic energy storing device which can efficiently store and discharge energy even if an initial strain of an elastic cord wound onto a drum having small diameter is zero or nearly equal to zero.

Another object of the present invention is to provide an elastic energy storing device which can be small-sized and lightweight in comparison with the conventional device shown in FIGS. 23 and 24.

To accomplish the above objects, an energy storing device according to the present invention comprises:

(a) a first drum, a second drum and at least one intermediate drum disposed between the first drum and the second drum, axes of the drums being parallel to each other, and the drums being rotatable around their respective axes;

(b) an elastic cord having a first end portion fixed to and wound onto the first drum, a second end portion fixed to and wound onto the second drum, and an intermediate portion wound at least partly around the intermediate drum; and (c) means for connecting the first drum, the second drum and the at least one intermediate drum so that upon rotation of the drums, the peripheral displacement of the second drum is greater than the peripheral displacement of the intermediate drum and the peripheral displacement of the intermediate drum is greater than the peripheral displacement of the first drum.

Here, the peripheral displacement is defined as the linear distance moved by a point located on the periphery of a drum, per unit time and in the circumferential direction of the drum, when the drum is rotated.

In the above defined energy storing device according to the present invention, when energy is stored in the device, the amount of the first portion of the elastic cord wound onto the first drum decreases and the amount of the second portion of the elastic cord wound onto the second drum increases. The amount of the elastic cord wound onto the intermediate drum does not change; only the axial position of the elastic cord wound onto the intermediate drum shifts as energy is stored or discharged.

When energy is stored, the elastic cord is unwound from the first drum, loops at least once around the intermediate drum and then is wound onto the second drum. Since the peripheral displacement of the intermediate drum is greater than that of the first drum, the portion of the elastic cord extending between the first drum and the intermediate drum is stretched, the elastic strain energy is stored in the elastic cord, and the strained elastic cord is looped around the intermediate drum. Since the peripheral displacement of the second drum is greater than that of the intermediate drum, the portion of the cord between the intermediate drum and the second drum is further stretched, additional elastic strain energy is stored in this portion of the elastic cord, and the further strained elastic cord is wound onto the second drum in a state of increased elastic strain energy. Since almost no slippage occurs between the elastic cord and the drums, almost all the strain increase of the elastic cord occurs in the portions between the first drum and the intermediate drum and between the intermediate drum and the second drum. Namely, after the elastic cord is stretched between the first drum and the intermediate drum and the strain energy is stored in the elastic cord looped around the intermediate drum, the elastic cord is further stretched between the intermediate drum and the second drum and finally the strain energy is stored in the elastic cord wound onto the second drum.

When the stored energy is discharged, the device acts in reverse to the operation when energy is stored. The elastic cord containing the elastic strain energy is unwound from the second drum to the intermediate drum. At that time the elastic strain of the elastic cord decreases by an amount corresponding to the difference between the peripheral displacement of the second drum and the peripheral displacement of the intermediate drum. Then the elastic cord is rewound from the intermediate drum onto the first drum. At that time the elastic strain of the elastic cord decreases by an amount corresponding to the difference between the peripheral displacements of the intermediate drum and of the first drum, and the elastic strain of the elastic cord rewound onto the first drum becomes the initial strain again.

In the energy discharging operation, if the intermediate drum did not exist, the elastic strain of the elastic cord between the second drum and the first drum would become the initial strain almost directly. Therefore, if the initial strain of the elastic cord is zero or nearly equal to zero, the energy output from the device obtained as an output torque from the drums becomes zero or nearly equal to zero. However, since the energy storing device according to the present invention has the at least one intermediate drum between the first drum and the second drum, the elastic strain of the cord between the intermediate drum and the second drum is assured of being higher than the initial strain. Accordingly, even if the initial strain is zero and even if the elastic cord has poor elasticity, the output energy is efficiently discharged.

BRIEF DESCRIPTION OF THE DRAWINGS

The above and other objects, features and advantages of the present invention will become apparent and more readily appreciated from the following detailed description of the preferred exemplary embodiments of the invention, taken in conjunction with the accompanying drawings, in which.

DETAILED DESCRIPTION OF THE PREFERRED EMBODIMENTS

Some preferred embodiments of the present invention will be described hereunder with reference to the attached drawings.

Figure 1:
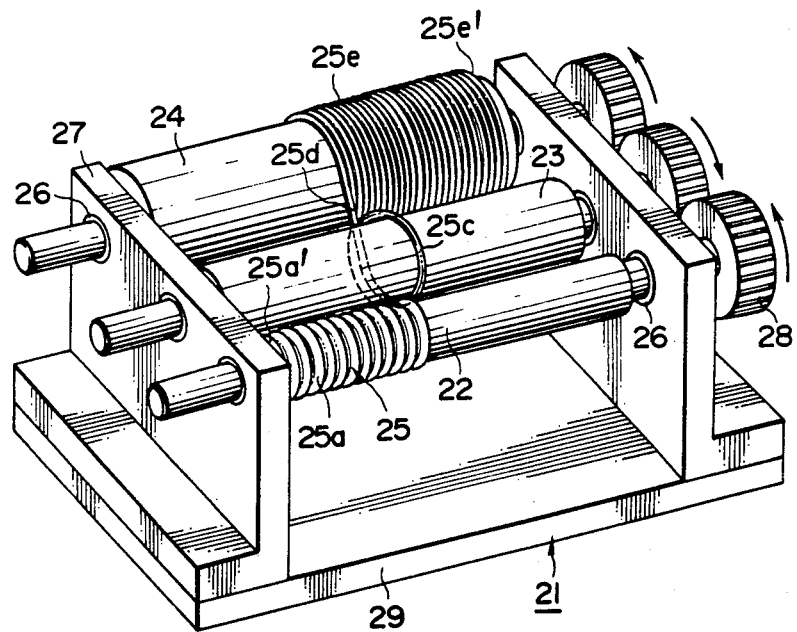
FIG. 1 is a perspective view of an energy storing device according to a first embodiment of the present invention.
Figure 2:
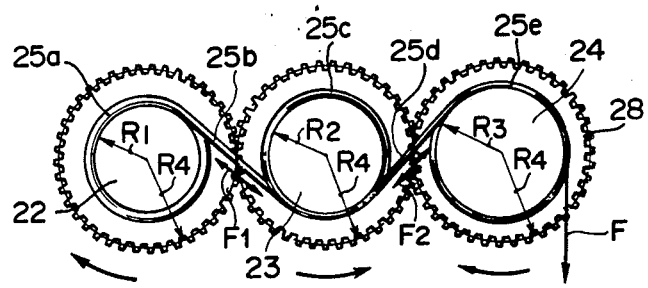
FIG. 2 is a schematic end view of the device shown in FIG. 1.
Figure 3:
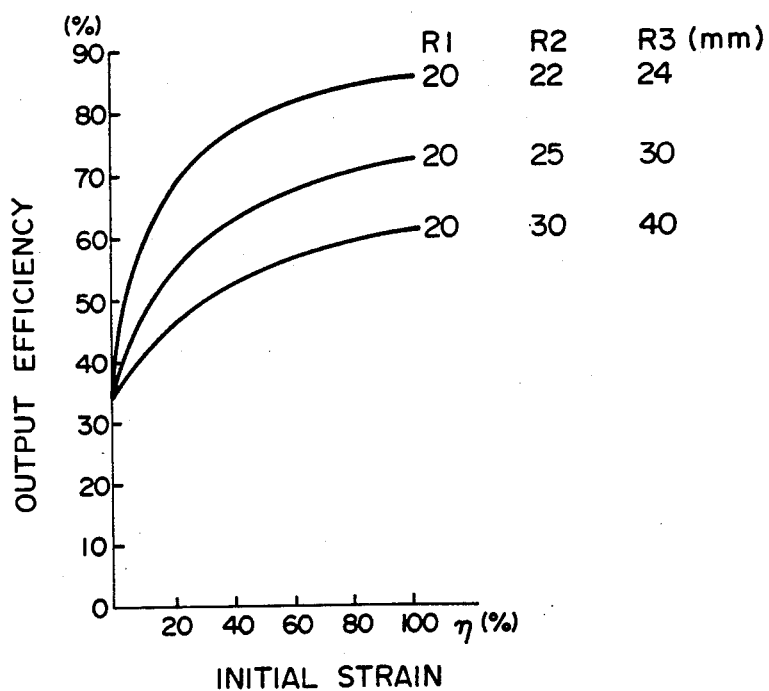
FIG. 3 is a graph showing the output efficiency of the device shown in FIG. 1.

FIGS. 1 and 2 show an energy storing device 21 according to a first embodiment of the present invention, and FIG. 3 shows the output efficiency of the device. The device 21 has a first drum 22, a second drum 24 and an intermediate drum 23 disposed between the first drum 22 and the second drum 24. The intermediate drum 23 has a diameter between the diameter of the first drum 22 and the diameter of the second drum 24. The axes of the three drums 22, 23 and 24 are parallel to each other, and the three drums 22, 23 and 24 are rotatable around their respective axes. An elastic cord 25 extends from first drum 22 to second drum 24 with at least one loop around intermediate drum 23. Bearings 26 rotatably support the shaft of each drum in supporting plates 27 mounted on a base plate 29.

Elastic cord 25 has a first portion 25a to be wound spirally onto first drum 22, a second portion 25e to be wound spirally onto second drum 24, a third portion 25c to be wound by one or two loops around intermediate drum 23 and fourth portions 25b and 25d extending between first drum 22 and intermediate drum 23 and between intermediate drum 23 and second drum 24. The first portion 25a, fourth portion 25b, third portion 25c, fourth portion 25d and second portion 25e continue sequentially in that order. An end portion 25a' of first portion 25a is fixed to first drum 22 and an end portion 25e' of second portion 25e is fixed to second drum 24.

First drum 22, second drum 24 and intermediate drum 23 are connected by a connecting means 28. In this embodiment the connecting means 28 comprises three gears engaging with each other and having the same number of teeth. The connecting means 28 connects drums 22, 23 and 24 mechanically so that the peripheral displacement of second drum 24 is greater than the peripheral displacement of intermediate drum 23 and the peripheral displacement of intermediate drum 23 is greater than the peripheral displacement of first drum 22.

When energy is stored in the device, the amount of elastic cord 25 wound onto second drum 24 increases and at the same time the amount of elastic cord 25 wound onto first drum 22 decreases. The amount of elastic cord 25 wound around intermediate drum 23 does not change; only the axial position of elastic cord 25 on intermediate drum 23 shifts as the drums rotate. When the stored energy is discharged, the amount of elastic cord 25 wound onto first drum 22 increases and at the same time the amount of elastic cord 25 wound onto second drum 24 decreases.

First portion 25a of elastic cord 25 directly contacts the periphery of first drum 22, second portion 25e of elastic cord 25 directly contacts the periphery of second drum 24 and third portion 25c of elastic cord 25 directly contacts the periphery of intermediate drum 23. Therefore, frictional force prevents slippage in the circumferential direction between elastic cord 25 and first drum 22, second drum 24 or intermediate drum 23. As a result, when elastic cord 25 is stretched in fourth portions 25b and 25d, the strain does not propagate over the entire length of the elastic cord but is generated only in the fourth portions 25b and 25d.

As shown in FIGS. 1 and 2, the winding direction of first portion 25a of elastic cord 25 onto first drum 22 is reverse to the winding direction of third portion 25c of elastic cord 25 onto intermediate drum 23. Also, the winding direction of third portion 25c of elastic cord 25 onto intermediate drum 23 is reverse to the winding direction of second portion 25e of elastic cord 25 onto second drum 24. First drum 22 and intermediate drum 23, and intermediate drum 23 and second drum 24 are connected by means 28 so as to rotate in opposite directions with a constant ratio of rotation. Fourth portions 25b and 25d extend obliquely between drum 22 and drum 23 and between drum 23 and drum 24.

First, storing of energy will be explained.

In FIG. 2, when a tension F acts on the periphery of second drum 24 for rotating the drums in order to store energy, first drum 22 and intermediate drum 23 connected to second drum 24 by connecting means 28 are rotated in the directions of the respective arrows. Now, the relationship between the radius R1 of first drum 22, the radius R2 of intermediate drum 23 and the radius R3 of second drum 24 is set to $R1 < R2 < R3$, and the three gears of connecting means 28 are set to have the same number of teeth and the same pitch circle radius R4. Consequently, the peripheral displacements of first drum 22, intermediate drum 23 and second drum 24 increase in the same order. Therefore, when drums 22, 23 and 24 are rotated in the directions of the arrows, the strains of fourth portions 25b and 25d increase by amounts corresponding to the differences between the peripheral displacement of first drum 22 and the peripheral displacement of intermediate drum 23 and between the peripheral displacement of intermediate drum 23 and the peripheral displacement of second drum 24. Since each of first drum 22, intermediate drum 23 and second drum 24 are right cylinders having constant diameters, the respective strains of the fourth portions 25b and 25d of elastic cord 25 are maintained constant.

Now, if elastic cord 25 is wound onto first drum 22 with an initial strain $\eta$, the tension F1 of fourth portion 25b and the tension F2 of fourth portion 25d are calculated pursuant to Hooke's law as shown in the following equations.

$$F1 = ((1+\eta)R2 - R1)E/R1$$

$$F2 = ((1+\eta)R3 - R1)E/R1$$

Here, E is Young's modulus of elastic cord 25.

The balance of forces on second drum 24 is as follows.

$$F = F1 \cdot (R2 - R1)/R3 + F2 (R3 - R2)/R3$$

From the above equations, a force (F)in, that is, a force when energy is stored in the device, is obtained as follows.

$$(F)\text{in} = (((1+\eta)R2 - R1)/R1 \cdot E \cdot ((R2-R1)/R3) + (((1+\eta)R3 - R1)/R1)[19 E \cdot ((R3-R2)/R3)$$

With this force $F = (F)\text{in}$, elastic cord 25 is wound from first drum 22 to second drum 24, and the elastic strain energy of elastic cord 25 is stored in the elastic cord 25 wound ont second drum 24.

Next, discharging of energy is explained.

When the stored energy is discharged, the device acts in reverse to the operation when energy is stored. The elastic cord 25, having been wound onto second drum 24 in the condition of strain equal to
$((1+\eta)R3-R1)/R1$, is unwound from second drum 24 to intermediate drum 23. At that time, the strain of portion 25d decreases by an amount corresponding to the difference between the peripheral displacement of second drum 24 and the peripheral displacement of intermediate drum 23. At the same time, the elastic cord 25 is rewound from intermediate drum 23 onto first drum 22, and the strain of portion 25b decreases by an amount corresponding to the difference between the peripheral displacement of intermediate drum 23 and the peripheral displacement of first drum 22, and the strain of elastic cord 25 wound onto first drum 22 becomes the initial strain $\eta$ again. In the above condition, the tension F1 of fourth portion 25b and the tension F2 of fourth portion 25d become as follows.

$$F2 = (((1+\eta)R2-R1)/R1) \cdot E$$

$$F1 = \eta \cdot E$$

A force (F)out acting to rotate second drum 24 is obtained from the following equation.

$$(F)\text{out} = (((1+\eta)R2-R1)/R1) \cdot E \cdot ((R3-R2)/R3) + \eta \cdot E \cdot ((R2-R1)/R3)$$

The theoretical energy output efficiency of the device is obtained as (F)out/(F)in.

The calculated results are shown in FIG. 3.

Figure 26:
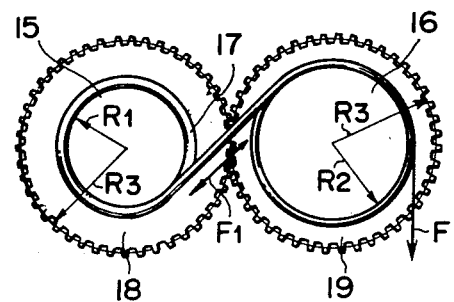
FIG. 26 is a schematic end view of an energy storing device according to a modification of the device shown in FIG. 25.

In order to compare the device of FIGS. 1 and 2 with the conventional device of FIG. 26, the theoretical output efficiency of the device shown in FIG. 26 is calculated as follows. In FIG. 26, the balance of forces on the large drum 16 is as follows.

$$F = F1(1-(R1/R2))$$

When energy is stored, F1 becomes as follows.

$$F1 = E((1+\eta)R2/R1-1)$$

Here, $\eta$ is the initial strain of elastic cord 17 wound onto the small drum 15, and E is Young's modulus of the elastic cord 17. When the stored energy is discharged, F1 becomes as follows.

$$F1 = E\eta$$

As a result, the theoretical output efficiency is obtained as follows.

$$(\eta(1-R1/R2))/(((1+\eta)R2/R1-1)(1-R1/R2))$$

Therefore, if the initial strain $\eta$ is equal to zero, the output becomes zero, and the output efficiency also becomes zero. The calculated result is shown in FIG. 4.

Figure 4:
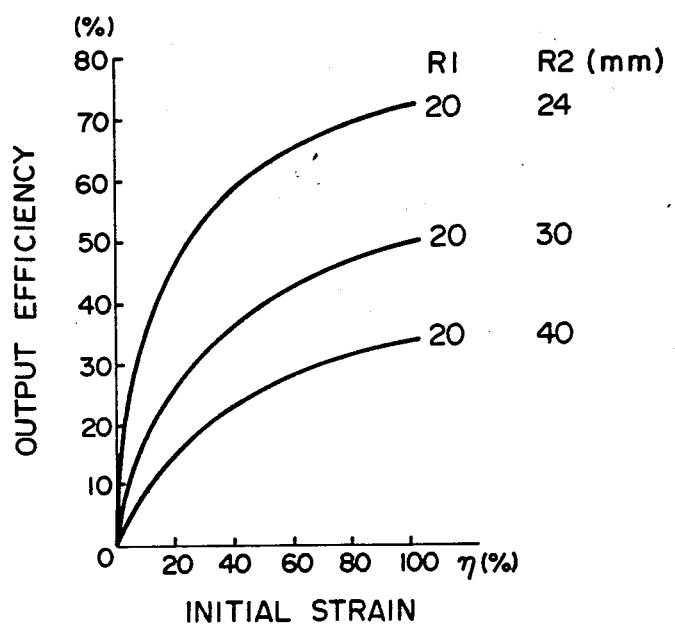
FIG. 4 is a graph showing the output efficiency of a conventional energy storing device shown in FIG. 26.
Figure 25:
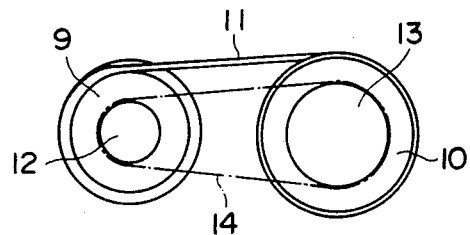
FIG. 25 is a schematic end view of another type of conventional energy storing device.

As is evident from FIGS. 3 and 4, the device having one intermediate drum according to the present invention has an excellent output efficiency as compared with the conventional two drum system energy storing device as shown in FIGS. 25 and 26, and can have a high efficiency even if the initial strain of the elastic cord is zero or nearly equal to zero.

In the above embodiment, the difference between the peripheral displacements of the drums is ensured by the difference between drum diameters. However, the diameters of all the drums may be set to be the same, and the ratios of driving force transmission mechanisms of the connecting means 28, that is, the gear ratios of the connecting means 28, can provide the differences between peripheral displacements of the drums.

In the present invention, the output efficiency of the device is further increased by increasing the number of intermediate drums.

Figure 5:
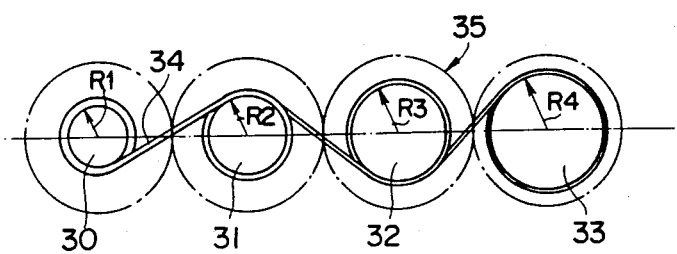
FIG. 5 is a schematic end view of an energy storing device according to a second embodiment of the present invention.

For instance, FIG. 5 shows an energy storing device comprising two intermediate drums 31 and 32, a first drum 30 and a second drum 33, according to a second embodiment of the present invention. An elastic cord 34 extends from first drum 30 to second drum 33 via intermediate drums 31 and 32. The radii R1, R2, R3 and R4 of the drums increase in that order. The drums 30, 31, 32 and 33 are mechanically connected by connecting means such as gears 35, so that adjacent drums can rotate in opposite directions.

Figure 6:
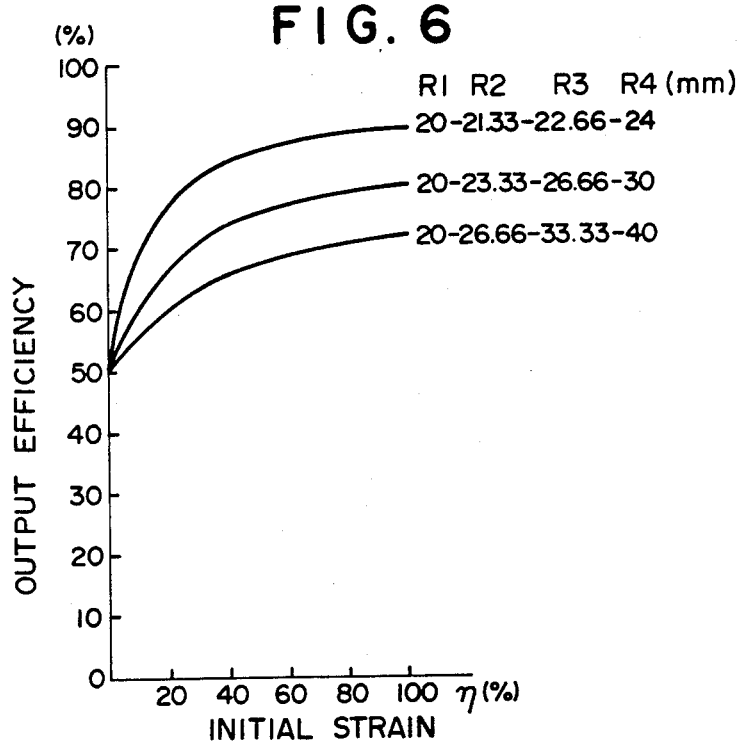
FIG. 6 is a graph showing the output efficiency of the device shown in FIG. 5.

In such an energy storing device, the relationship between the initial strain $\eta$ of elastic cord 34 and the theoretical output efficiency of the device becomes as shown in FIG. 6. As is evident from the comparison between FIGS. 3 and 6, the theoretical output efficiency of the device can be raised by increasing of the number of the intermediate drums.

Figure 7:
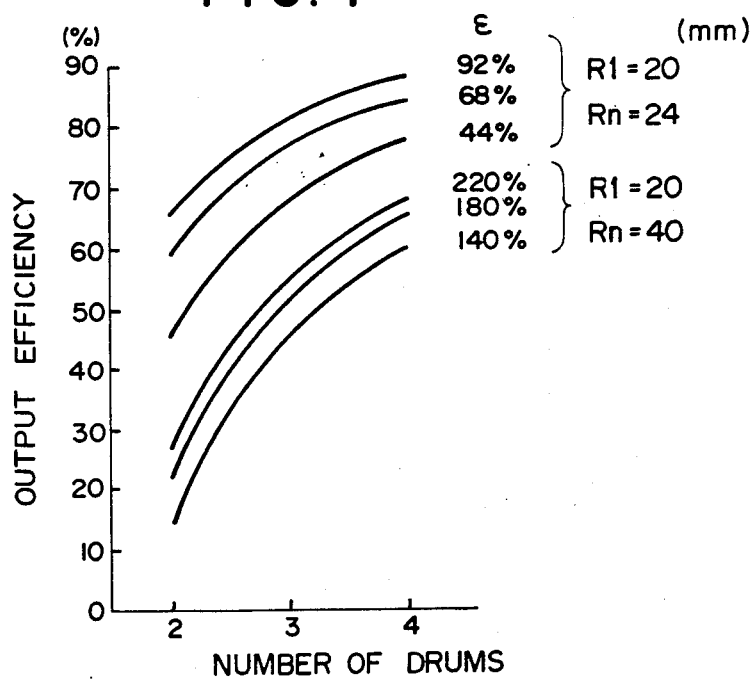
FIG. 7 is a graph showing the relationship between the number of drums and the output efficiency.

The relationship between the total number of drums in an energy storing device and the output efficiency of the device is shown in FIG. 7, where R1 is the radius of a first drum, Rn shows the radius of a second drum, and $\epsilon$ represents the maximum strain when an elastic cord is wound onto the second drum. As shown in FIG. 7, the greater the number of drums, the higher is the theoretical output efficiency of the device.

Figure 8:
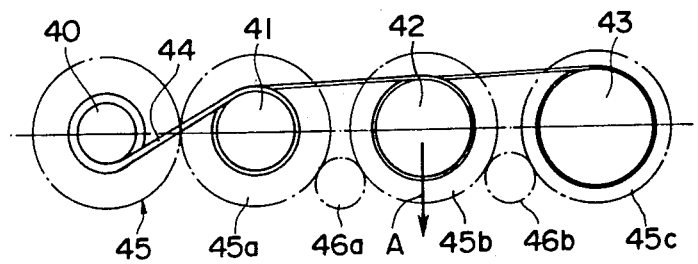
FIG. 8 is a schematic end view of an energy storing device according to a third embodiment of the present invention.

Next, an energy storing device according to a third embodiment of the present invention is shown in FIG. 8.

In this embodiment, an elastic cord 44 extends from a first drum 40 to a second drum 43 via intermediate drums 41 and 42. The drums 40, 41, 42 and 43 are mechanically connected by gears 45. An idler gear 46a is disposed between a gear 45a and a gear 45b, and an idler gear 46b is disposed between the gear 45b and a gear 45c, whereby each of the drums 41, 42 and 43 is rotated in the same direction.

When adjacent drums 41, 42 and 43 rotate in the same direction, there is almost no force component acting on the bearings of drum 42 in the direction A due to tension in elastic cord 44. All of the drums may be rotated in the same direction, or only some of the drums may be rotated in the same direction. As other methods for rotating adjacent drums in the same direction, the combination of a chain and sprockets or the combination of a belt and pulleys may be adopted.

Figure 9:
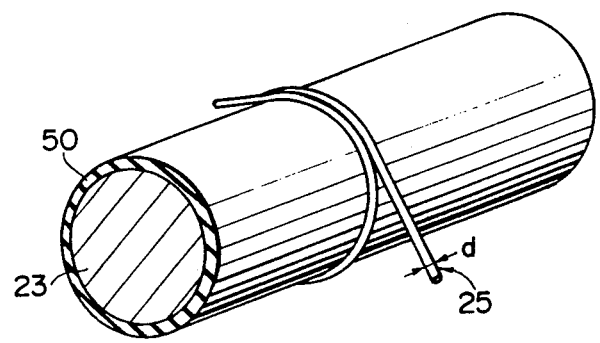
FIG. 9 is a perspective view of the intermediate drum shown in FIG. 1, the peripheral surface of the drum being constructed from a material having a high friction coefficient.

FIG. 9 shows a drum structure wherein the surface of the intermediate drum 23 shown in FIG. 1 is covered with a material 50 having a high friction coefficient with respect to the elastic cord 25. Since slippage between elastic cord 25 and intermediate drum 23 decreases the output efficiency of the device to approach the efficiency of the devices shown in FIGS. 25 and 26, slippage should be prevented as completely as possible.

In this embodiment, slippage can be prevented by the material 50 having a high friction coefficient. The material 50 consists of, for example, rubber or urethane, preferably having a thickness in the range 0.1–1.0 times the diameter d of elastic cord 25. The material 50 consisting of a rubber or urethane is adhered to the intermediate drum 23, for example, by vulcanizing. The hardness of the material 50 is preferably about 80 Hs, from the viewpoint of abrasion resistance. The friction coefficient of the material 50 with respect to elastic cord 25 is preferably not less than 1. The diameter of the intermediate drum is set largely by the compressive deformation of the material 50 due to the tension of elastic cord 25.

Thus by preventing slippage of elastic cord 25 on intermediate drum 23, the strain of elastic cord 25 wound onto the intermediate drum can be maintained at a constant and predetermined quantity, and a high output efficiency of the device can be maintained.

In the device shown in FIG. 1, the rotation directions of drums 22, 23 and 24 are reverse between energy storage and energy discharge. Therefore, if storing and discharging of energy are carried out via the same drum or gear, the rotation direction of the drum or gear reverses between energy storage and energy discharge. Usually, however, the same rotation direction is required for storing and discharging energy. This requirement is satisfied simply, and without making the device too large, by adding an input-output switching mechanism as shown in FIG. 10.

Figure 10:
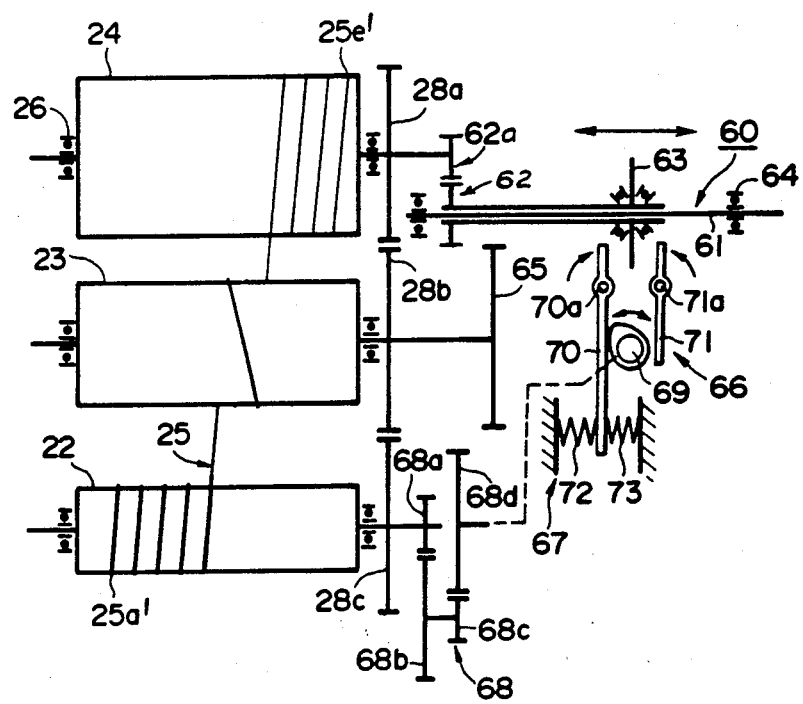
FIG. 10 is a schematic plan view of a device as shown in FIG. 1, provided with an input-output switching mechanism and protecting means for the elastic cord.

In FIG. 10, an input-output switching mechanism 60 for switching between an energy storing condition and an energy discharging condition comprises an input-output shaft 61, a switching gear 62, and shifting means 63 for moving switching gear 62. Input-output shaft 61 extends parallel to the axes of the drums and is rotatably supported by bearings 64 at both ends. Switching gear 62 engages input-output shaft 61 via splines, so that gear 62 is movable axially on input-output shaft 61 while rotating integrally with the shaft.

When energy is stored, an input torque is transmitted from input-output shaft 61 to switching gear 62, and when energy is discharged, an output torque is transmitted from switching gear 62 to input-output shaft 61. The switching gear 62 is moved axially on input-output shaft 61 by the operation of shifting means 63 between selective engagement with a gear 62a, disposed parallel to a gear 28a for second drum 24, when energy is stored, and engagement with a gear 65, disposed parallel to a gear 28b for third drum 23, when energy is discharged. Gears 28a and 65 rotate in opposite directions.

In such a structure, the rotation direction of switching gear 62 engaged with gear 28a when energy is stored is the same as the rotation direction of switching gear 62 engaged with gear 65 when energy is discharged.

In addition, a protecting means 66 for protecting elastic cord 25 is connected to input-output switching mechanism 60. The protecting means 66 stops the input of energy to the device and the output of energy from the device by switching the mechanism 60 to a neutral position where switching gear 62 does not engage with either of gears 28a and 65, when the amount of elastic cord 25 wound onto one of first drum 22 and second drum 24 reaches a predetermined small amount.

The protecting means 66 includes a rotation speed reducer 68, a cam 69, and release levers 70 and 71. Reducer 68 has a gear 68a directly connected to a gear 28c for first drum 22, a gear 68b engaging with the gear 68a, a gear 68c directly connected to the gear 68b and a gear 68d engaging with the gear 68c. The final gear 68d is connected to cam 69 via appropriate means. The angle of rotation of cam 69 is thus reduced proportionally to the total angle of rotation of first drum 22. Release levers 70 and 71 are swingably supported at fulcrums 70a and 71a, respectively, so that cam 69 can selectively push one end of either lever 70 or 71 to cause the other end of lever 70 or 71 to move shifing means 63 by swinging of the lever 70 or 71.

In the energy storage mode, when the length of elastic cord 25 remaining wound on first drum 22 decreases to a predetermined small amount and the length of cord wound onto second drum 24 increases to a predetermined large amount, cam 69 pushes one end of lever 70, the lever 70 is swung, and the other end of the lever 70 pushes shifting means 63 to disengage switching gear 62 from gear 28a, so that further input of energy is stopped automatically. This prevents end portion 25a' of elastic cord 25 from being reverse wound onto first drum 22 and from receiving an excessive tension load, thereby avoiding damage to or breaking of the cord.

In the energy discharge mode, when the length of elastic cord 25 remaining wound on second drum 24 decreases to a predetermined small amount and the length of cord wound onto first drum 22 increases to a predetermined large amount, cam 69 pushes one end of lever 71, the lever 71 is swung, and the other end of the lever 71 pushes shifting means 63 to disengage switching gear 62 from gear 65, so that end portion 25e' of elastic cord 25 will not become reverse wound on second drum 24.

Furthermore, an overheat preventing means 67 is also connected to input-output switching mechanism 60 shown in FIG. 10 to stop the input of energy to the device by shifting mechanism 60 to a neutral position when the temperature of elastic cord 25 reaches a predetermined high temperature.

If the input and output of energy are frequently repeated, elastic cord 25 is heated by its internal hysteresis. However, in this embodiment, when the temperature of elastic cord 25 exceeds a predetermined value, the input of energy is automatically stopped by overheat preventing means 67.

A temperature sensing and driving means 72 is provided on one side of the one end of lever 70, and a bias spring 73 is provided on the other side of the same end of the lever. The temperature sensing and driving means 72 is constructed from, for example, thermo wax or configuration memorizing alloy capable of expanding and contracting in accordance with temperature. The temperature sensing and driving means 72 indirectly senses the temperature of elastic cord 25, and when the temperature exceeds a predetermined value, the means 72 contracts, swinging lever 70 in the direction to disengage switching gear 62 from gear 28a. Bias spring 73 pulls the lever 70 opposite to the direction of contraction of the means 72.

By addition of such means, overheating of elastic cord 25 and resulting deterioration can be prevented, increasing the life of elastic cord 25.

Figure 11:
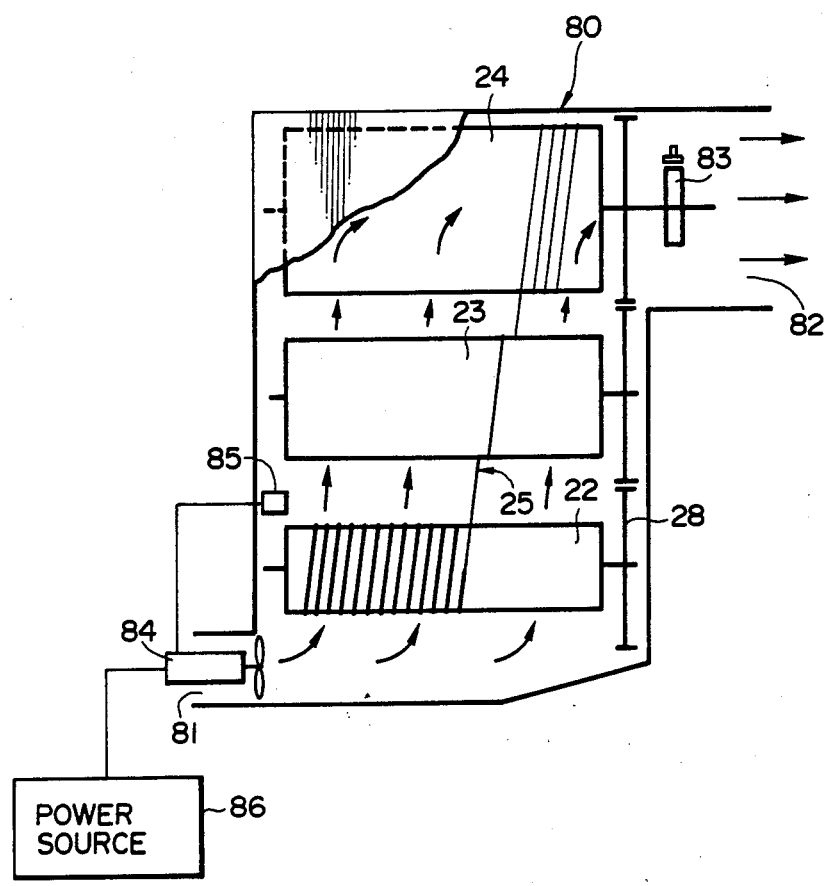
FIG. 11 is a schematic plan view of a device as shown in FIG. 1, additionally provided with means for delivering cooling air to the device.

Alternatively, the elastic cord 25 may be cooled positively. FIG. 11 shows an arrangement wherein cooling means is provided for the device shown in FIG. 1. In FIG. 11, a casing 80 encloses first drum 22, intermediate drum 23, second drum 24, and connecting means 28. An inlet 81 for cooling air is provided in the casing near first drum 22 and an air outlet 82 is provided near second drum 24. A braking device 83 is disposed in the air outlet 82 and is connected to second drum 24 to brake the rotation of the second drum.

A fan 84 is provided in the air inlet 81 as means for delivering cooling air into the casing 80. The air flows in the direction from the side of first drum 22 to the side of second drum 24 via intermediate drum 23, and then the air exhausts from air outlet 82 to outside.

Inside the casing 80 a temperature sensor 85 detects the temperature of the atmosphere in the casing 80, and when the atmosphere temperature becomes higher than a predetermined value, power is switched from a power source 86 to fan 84 in response to the signal from the sensor 85, thereby driving the fan 84. Since fan 84 operates only when the atmosphere temperature becomes high, the energy for driving the fan 84 is less than if the fan 84 runs continuously.

When the temperature of elastic cord 25 becomes high, the temperature of the atmosphere inside the casing 80 also becomes high. Thus, the temperature sensor 85 detects the temperature of elastic cord 25 indirectly via the atmosphere temperature, and by positive cooling, overheating of elastic cord 25 can be prevented.

Moreover, since braking device 83 is located in air outlet 82, powder due to abrasion of a brake lining or a brake drum in the braking device is exhausted with the cooling air. Therefore, the powder will not enter casing 80. This avoids deposition of the powder onto the drums and prevents slippage of elastic cord 25 on the drums due to the powder.

In FIG. 11, fan 84 is provided on the air inlet side of casing 80, but fan 84 may be located on the air outlet side. In addition, a filter may be provided in or upstream of air inlet 81 to assure dust-free atmosphere inside the casing.

The drum structures according to the embodiments shown in FIGS. 12–15 aim at decreasing the inertia of a drum together with cooling of elastic cord 25. Since a plurality of drums are mechanically connected by gears, an excessive load may act on the gears when the rotation of the drums starts or stops very quickly. Moreover, if the inertia of the drums is very large, the input torque also becomes large when energy is stored, causing reduced fuel economy of a vehicle in which the energy storing device is installed.

Figure 12:
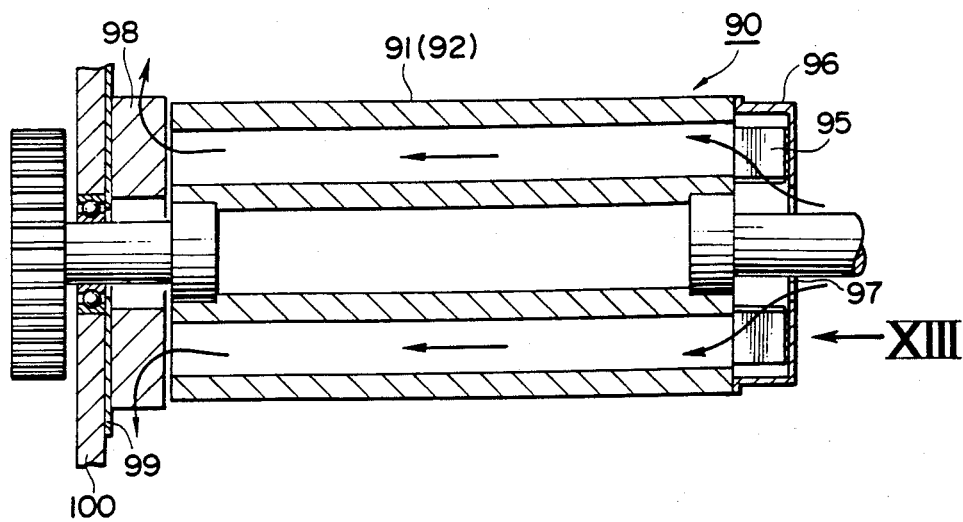
FIG. 12 is an axial section of a drum suitable for a device according to the present invention.
Figure 13:
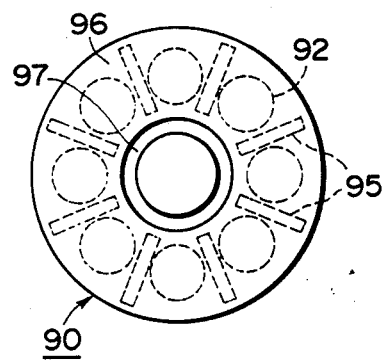
FIG. 13, is an end view of the drum shown in FIG. 12, viewed in the direction of the arrow XIII.
Figure 14:
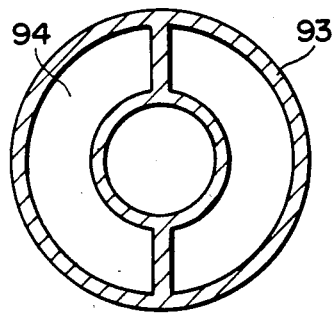
FIG. 14 is a sectional view of an alternative drum structure, showing another hollow interior arrangement of the drum different from the structure shown in FIG. 13.

FIG. 12 shows one embodiment of a drum 90 having a hollow portion 91 formed by a plurality of bores 92 extending in the axial direction through the drum 90. Bores 92 open at both ends and are circumferentially spaced, as shown in FIG. 13. An alternative hollow structure of a drum may be achieved as shown in FIG. 14, in which a drum 93 is divided by a diametral partition into a duplex tube structure, so that almost all of the inside of the drum 93 is formed as a hollow portion 94.

As shown by FIGS. 12 and 13, a plurality of angularly spaced radial vanes 95 are mounted on one end of drum 90 for sending cooling air into the hollow portion 91 upon rotation of the drum. Vanes 95 are enclosed by a cover 96 having a central opening 97 for delivering a flow of air from outside of cover 96 to bores 92 through the spaces between vanes 95.

At the other end of drum 90, a set of argularly spaced radial vanes 98 are fixed to an attaching plate 99 that is secured to a support plate 100.

Figure 15:
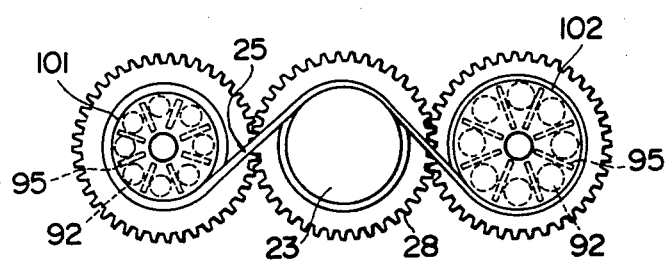
FIG. 15 is a schematic end view of the drum arrangement shown in FIG. 1, in which the first drum and the second drum are provided with the hollow structure shown in FIG. 12.
Figure 16:
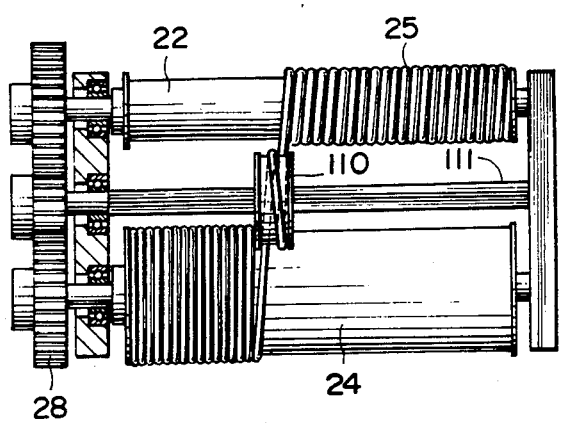
FIG. 16 is a plan view of an energy storing device according to a fourth embodiment of the present invention.

FIG. 15 shows a device similar to the embodiment of FIG. 1, in which a first drum 101 and a second drum 102 have the hollow structure shown in FIGS. 12 and 13. Since the amount of elastic cord 25 wrapped around intermediate drum 23 is small, the temperature of the intermediate drum does not rise so much. Therefore, from the viewpoint of preventing the drums from becoming too hot, it is not always necessary to make the intermediate drum 23 hollow.

Since the masses and rotational inertias of drums 101 and 102 are decreased by the hollow construction in the embodiment of FIG. 15, the load on the gears 28 is decreased greatly when rotation of the drums starts or stops quickly.

The power for driving the drums also can be decreased by decreasing the masses of the drums, and energy can be efficiently stored with a small power. Also when energy is discharged, if the masses of the drums are large, the ratio between the quantities of discharged energy and stored energy becomes low. This ratio (that is, output efficiency) also can be increased by the above decrease of the masses of the drums. Accordingly, from the viewpoint of the above advantages, the intermediate drum 23 may also desirably be a hollow structure.

Furthermore, since the vanes 95 are fixed to one end of the drums 101 and 102, air flows through opening 97 (FIG. 12) and between fins 95 in the radial direction toward the outside of the drums when the drums are rotated. Since each space between fins 95 forms an air passage and communicates with the opening of a bore 92, the air inducted through from the opening 97 is also sent into each bore 92 by the above action of vanes 95, as shown by the arrows in FIG. 12. The air flows along the bores 92 in the axial direction of the drum, and then flows out from the other end portion of the drum, thereby cooling the drum from the inside continuously during the rotation of the drum. Fixed vanes 98 on the plate 99 at the air exhaust end of the drum draw the air from each bore 92 efficiently and positively due to relative rotation of the drum with respect to vanes 98.

Thus the drums 101 and 102 are positively cooled from the inside, naturally and efficiently in conjunctions with the rotation of the drums, and elastic cord 25 can be prevented from becoming too hot.

Next, FIGS. 16–19 show an energy storing device according to a fourth embodiment of the present invention.

Figure 18:
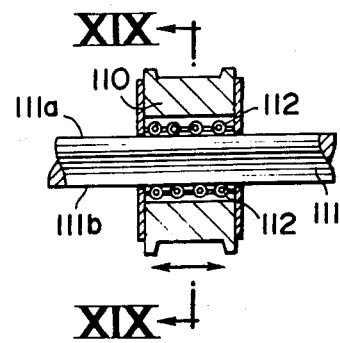
FIG. 18 is an enlarged longitudinal sectional view of the intermediate drum shown in FIG. 16.
Figure 19:
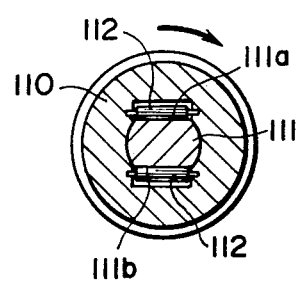
FIG. 19 is a sectional view of the intermediate drum shown in FIG. 18, cut along line XIX—XIX.

This embodiment incomporates an axially movable intermediate drum 110. As shown in FIGS. 18 and 19, intermediate drum 110 is supported on two parallel flat surfaces 111a and 111b of a shaft 111 via roller bearings 112, so as to rotate integrally with the shaft 111 and yet be movable on the shaft in the axial direction. The axial length of intermediate drum 110 is less than the length of first drum 22 or second drum 24. The intermediate drum 110 is positioned axially by the tension in elastic cord 25.

Figure 17:
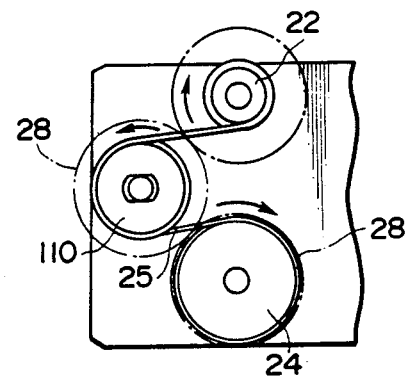
FIG. 17 is a schematic end view of the drum arrangement shown in FIG. 16.

Thus, by making the intermediate drum 110 movable in the axial direction, the drum 110 is inherently small, allowing the energy storing device to be constructed small-sized as a whole. Moreover, the inertia of such a small intermediate drum 110 is also small. Furthermore, by arranging the drums as shown in FIG. 17, the distance between first drum 22 and second drum 24 can be shortened, thereby making the device more compact.

Figure 20:
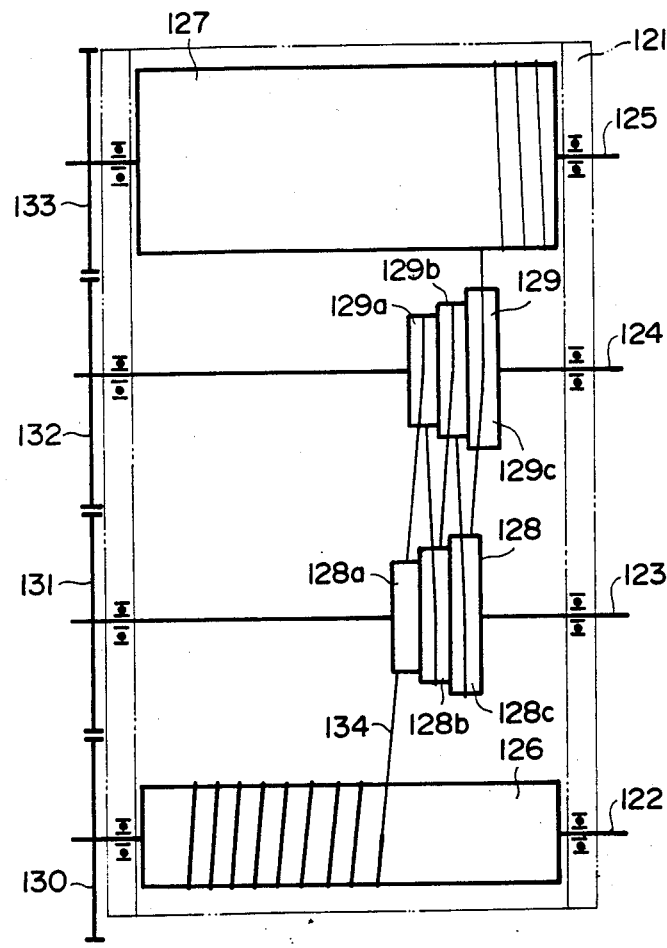
FIG. 20 is a schematic plan view of an energy storing device according to a fifth embodiment of the present invention.

Next, FIG. 20 shows an energy storing device according to a fifth embodiment of the present invention.

In FIG. 20, four parallel shafts 122, 123, 124 and 125 are rotatably supported in a frame 121 via bearings. A first drum 126 having a small diameter is supported by shaft 122 and a second drum 127 having a large diameter is supported by shaft 125, so as to be rotated integrally with shaft 122 and 125 respectively. This embodiment includes a combination of a pair of intermediate drums 128 and 129. Each of drums 128 and 129 is in the form of a stepped cylinder, and the drums 128 and 129 are supported by shafts 123 and 124 so as to rotate integrally with the shafts but to move axially along shafts 123 and 124, respectively.

Gears 130, 131, 132 and 133 are attached to respective end portions of shaft 122, 123, 124, and 125, and the shafts and the drums are mechanically connected to each other by the gears. In this embodiment, all of the gears 130, 131, 132 and 133 have the same number of teeth. Then, by making the diameters of drums 126, 128, 129 and 127 progressively larger, in that order, the peripheral displacements of the drums 126, 128, 129 and 127 also increase progressively in the same order. An elastic cord 134 extends from first drum 126 to second drum 127 via intermediate drums 128 and 129

Each of the intermediate drums 128 and 129 is a stepped cylinder having a plurality of different diameters arranged in order from a portion having a smallest diameter to a portion having a largest diameter. Although both of the drums 128 and 129 have three steps in this embodiment, the larger the number of the steps, the higher is the theoretical efficiency of the device for storing energy. Similarly, increasing the number of intermediate drums to more than two also can increase the efficiency of the device.

In this embodiment, elastic cord 134 is wound and extended between the drums 128 and 129 as follows.

The elastic cord 134 from first drum 126 is wound onto a portion 128a having the smallest diameter of drum 128, and after being given a certain degree of winding angle, the elastic cord 134 extends to a portion 129a having the smallest diameter of drum 129 and is wound thereonto. Then the elastic cord 134 from the portion 129a is wound onto the next portion 128b having a next larger diameter of drum 128. In the same manner, elastic cord 134 leads from the portion 128b to loop around the portion 129b of drum 129, from the portion 129b around the portion 128c having the largest diameter of drum 128, from the portion 128c around the portion 129c having the largest diameter of drum 129, and finally the elastic cord 134 extends from the portion 129c of drum 129 and is wound onto second drum 127. Thus elastic cord 134 is wound onto the drums 128 and 129, in turn between the drums 128 and 129, from the smaller diameter portion end to the larger diameter portion end. Here, the relationship between the diameters of drums is: the diameter of first drum 126 < the diameter of the portion 128a of drum 128 < the diameter of the portion 129a of drum 129 < the diameter of the portion 128b of drum 128 < the diameter of the portion 129b of drum 129 < the diameter of the portion 128c of drum 128 < the diameter of the portion 129c of drum 129 < the diameter of second drum 127.

In intermediate drums 128 and 129, each of the portions having different diameters is desirably formed with a V-groove or a crown in order to keep the elastic cord 134 in position.

Since each of the intermediate drums 128 and 129 is a stepped drum having a plurality of portions with different diameters, the energy storing and discharging function is equivalent to that of a device having the same number of separate intermediate drums as the total number (that is, six) of the portions of drums 128 and 129 as are provided in this embodiment, whereby a high theoretical output efficiency of the device can be obtained. Since the actual number of intermediate drums is only two, however, the device as a whole can be extremely small in comparison with a device having the same equivalent number of separate intermediate drums.

Figure 21:
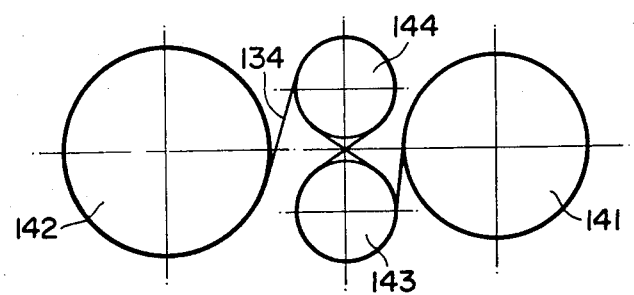
FIG. 21 is a schematic end view of an alternative arrangement of two intermediate drums of the device shown in FIG. 20.

In the arrangement of FIG. 20, two intermediate drums 128 and 129 are coplanar with the axis of first drum 126 and the axis of second drum 127. However, as shown in FIG. 21, two stepped-cylinder intermediate drums 143 and 144 may be arranged in a plane perpendicular to the plane containing the axis of first drum 141 and the axis of second drum 142. In such an arrangement, the distance between first drum 141 and second drum 142 is reduced to allow the device as a whole to become more compact.

Figure 22:
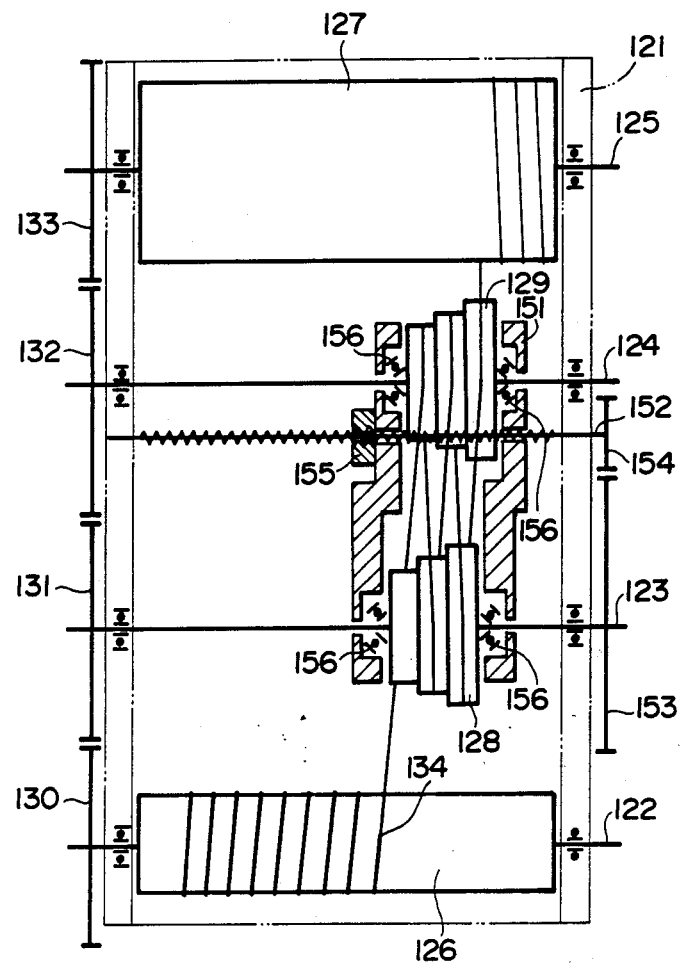
FIG. 22 is a schematic plan view of an energy storing device according to a modification of the embodiment shown in FIG. 20.

FIG. 22 shows a modification of the embodiment shown in FIG. 20, to which a moving frame 151, a screw shaft 152, gears 153 and 154, and a nut 155 have been added. The screw shaft 152 is disposed parallel to the drums and is driven via gear 153 fixed to shaft 123 and gear 154 fixed to screw shaft 152. Nut 155 engages screw shaft 152 and is fixed to frame 151, so that frame 151 is moved along the screw shaft 152 by rotation of the shaft. Frame 151 extends along both ends of drums 128 and 129, and the frame 151 is supported by shafts 123 and 124 for drums 128 and 129 via angular type thrust bearings 156 at both ends of drums 128 and 129. Therefore, frame 151 and drums 128 and 129 are moved integrally, concurrently and in the same axial direction by rotation of screw shaft 152 in nut 155. The numbers of teeth of gears 153 and 154 and the pitch of screw shaft 152 are selected so that the axial displacememt of frame 151 will be equal to the axial displacement of elastic cord 134 when the elastic cord 134 is transferred between first drum 126 and second drum 127.

In this embodiment, intermediate drums 128 and 129 are moved positively in the axial direction by the screw 152 turning in nut 155. Accordingly, the tension of elastic cord 134 is not required to shift drums 128 and 129 axially on shafts 123 and 124. As a result, the movement speed of drums 128 and 129 does not change depending on the degree of tension of elastic cord 134, and the drums 128 and 129 will always track the axial shift of the cord on drums 126 and 127. By this action, erratic winding of elastic cord 134 onto first drum 126 or second drum 127 can be prevented, and elastic cord 134 will be neatly wound onto the drum 126 or 127 with a desirable pitch. Moreover, since a large load due to additional tension in elastic cord 134 is not applied to shafts 123 and 124 for drums 128 and 129, the diameters of the shafts 123 and 124 may be small.

In the above embodiments, the stored elastic energy is retained and selectively released, by means connected to one of the drums or the connecting means, such as the braking device 83 shown in FIG. 11.

As described above in detail, since at least one intermediate drum is provided in an energy storing device according to the present invention as compared with the prior art two drum device as shown in FIGS. 25 and 26, a positive energy output can be obtained even if the initial strain of the elastic cord is zero, and a high theoretical output efficiency of the device can be achieved. When the number of intermediate drums is increased, the output efficiency of the device can be further raised.

Figure 23:
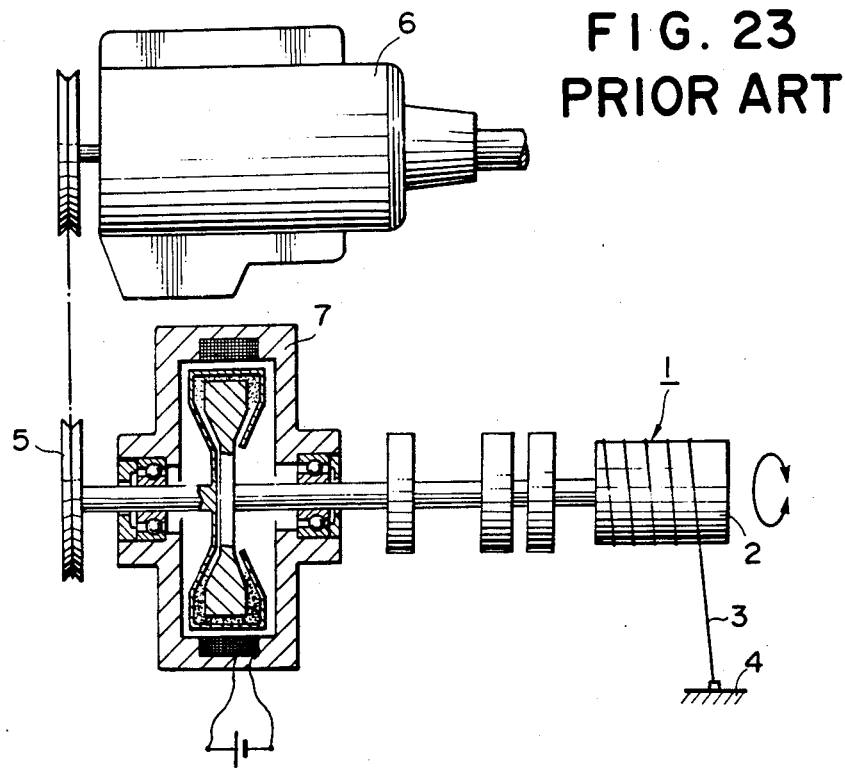
FIG. 23 is a schematic plan view of a conventional energy storing device.
Figure 24:
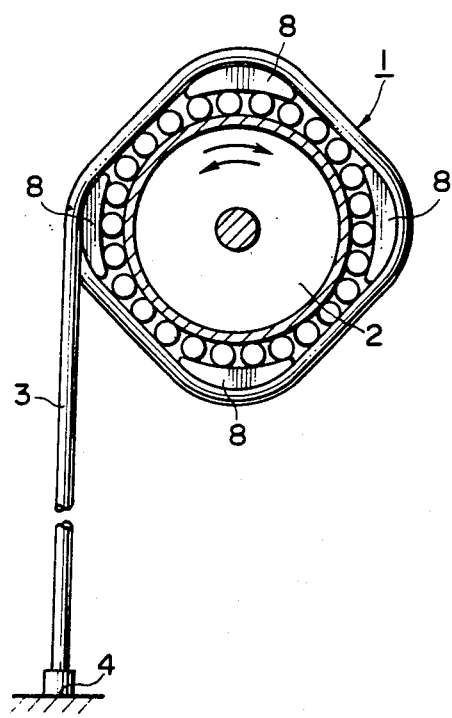
FIG. 24 is an enlarged cross-sectional view of the energy storing drum in FIG. 23.

Moreover, since a device according to the present invention adopts a system wherein an elastic cord is mostly strained between drums, and the strained elastic cord is continuously wound onto a drum, as compared with the prior art system as shown in FIGS. 23 and 24, a large load does not act on the supporting portions of the drums and the device can be made compact.

Although only several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. An energy storing device comprising:
a first drum, a second drum and at least one intermediate drum disposed between said first drum and said second drum, axes of said drums being parallel to each other, and said drums being rotatable around the respective axes;
an elastic cord having a first end portion fixed to and wound onto said first drum, a second end portion fixed to and wound onto said second drum, and an intermediate portion wound at least partly around said intermediate drum; and
means for connecting said first drum, said second drum, and said at least one intermediate drum so that upon rotation of the drums, the peripheral displacement of said second drum is greater than the peripheral displacement of said intermediate drum and the peripheral displacement of said intermediate drum is greater than the peripheral displacement of said first drum.

2. The device of claim 1, wherein said connecting means connects said first drum, said second drum and said intermediate drum so that the rotational speeds of said first drum, said second drum, and said intermediate drum are all the same, and wherein the diameter of said second drum is greater than the diameter of said intermediate drum and the diameter of said intermediate drum is greater than the diameter of said first drum.

3. The device of claim 1, wherein the diameters of said first drum, said second drum and said intermediate drum are all the same, and the peripheral displacement of said second drum is set greater than the peripheral displacement of said intermediate drum and the peripheral displacement of said intermediate drum is set greater than the peripharal displacement of said first drum by the ratios of said connecting means between said intermediate drum and said second drum and between said first drum and said intermediate drum.

4. The device of claim 1, wherein the winding direction of a first portion of said elastic cord onto said first drum is reverse to the winding direction of a third portion of said elastic cord around said intermediate drum, the winding direction of said third portion of said elastic cord around said intermediate drum is reverse to the winding direction of a second portion of said elastic cord onto said second drum, the direction of rotation of said first drum is reverse to the direction of rotation of said intermediate drum and the direction of rotation of said intermediate drum is reverse to the direction of rotation of said second drum.

5. The device of claim 1, wherein at least the winding direction of a first portion of said elastic cord onto said first drum is the same as the winding direction of a third portion of said elastic cord around said intermediate drum, or at least the winding direction of said third portion of said elastic cord around said intermediate drum is the same as the winding direction of a second portion of said elastic cord onto said second drum, and said drums having the same winding direction of said elastic cord are rotated in the same direction by said connecting means.

6. The device of claim 1, wherein the peripheral surface of said intermediate drum is constructed from a material having a high friction coefficient with respect to said elastic cord.

7. The device of claim 1, wherein said at least one intermediate drum comprises a plurality of drums.

8. The device of claim 1, wherein said energy storing device further comprises an input-output switching mechanism engageable with at least one of said first, second and intermediate drums, and said connecting means, said mechanism switching said device between an energy storing condition and an energy discharging condition by shifting said mechanism between an energy input position and an energy output position.

9. The device of claim 1, wherein at least one of said first drum and said second drum comprises a hollow structure opened at both ends of said at least one drum, and vanes for sensing cooling air into a hollow portion of said hollow structure are fixed to one of the ends of said at least one drum.

10. The device of claim 1, wherein said connecting means comprises a plurality of gears.

11. The device of claim 1, wherein each of said first drum, said second drum and said intermediate drum is formed as a right circular cylinder having a constant diameter.

12. The device of claim 1, wherein a source of energy for storage by said device is inertia energy of a vehicle.

13. An energy storing device comprising:
a first drum, a second drum and at least one intermediate drum disposed between said first drum and said second drum, axes of said drums being parallel to each other, and said drums being rotatable around the respective axes;
an elastic cord having a first end portion fixed to and wound onto said first drum, a second end portion fixed to and wound onto said second drum, and an intermediate portion wound at least partly around said intermediate drum; and
means for connecting said first drum, said second drum, and said at least one intermediate drum so that upon rotation of the drums, the peripheral displacement of said second drum is greater than the peripheral displacement of said intermediate drum and the peripheral displacement of said intermediate drum is greater than the peripheral displacement of said first drum, and wherein said intermediate drum is movable axially with respect to said first and second drums.

14. An energy storing device comprising:
a first drum, a second drum and at least one intermediate drum disposed between said first drum and said second drum, axes of said drums being parallel to each other, and said drums being rotatable around the respective axes;
an elastic cord having a first end portion fixed to and wound onto said first drum, a second end portion fixed to and wound onto said second drum, and an intermediate portion wound at least partly around said intermediate drum;
means for connecting said first drum, said second drum, and said at least one intermediate drum so that upon rotation of the drums, the peripheral displacement of said second drum is greater than the peripheral displacement of said intermediate drum and the peripheral displacement of said intermediate drum is greater than the peripheral displacement of said first drum, and wherein said at least one intermediate drum comprises at least two drums having parallel axes, said at least two drums being supported for axial movement relative to the first and second drums, each of said at least two intermediate drums is in the form of a stepped cylinder which has a plurality of different diameters arranged in order from a portion having a smallest diameter to a portion having a largest diameter, said elastic cord from said first drum is wound at least partly around the portion having the smallest diameter of one drum of said at least two drums, said elastic cord from said portion having the smallest diameter of one drum is wound at least partly around the portion having the smallest diameter of the other drum of said at least two drums, said elastic cord from said portion having the smallest diameter of said other drum is wound at least partly around the portion having a next larger diameter of said one drum, in the same manner said elastic cord is wound onto said at least two drums, in turn between said at least two drums, from the smaller diameter portion end to the larger diameter portion end, and finally said elastic cord from said portion having the largest diameter of said other drum is wound onto said second drum.

15. The device of claim 14, wherein the axes of said at least two intermediate drums are coplanar with the axis of said first drum and the axis of said second drum.

16. The device of claim 14, wherein the axes of said at least two intermediate drums are arranged in a plane perpendicular to a plane containing the axis of said first drum and the axis of said second drum.

17. The device of claim 14, wherein said at least two intermediate drums are rotatably supported in a frame that is supported for movement axially with respect to said first and second drums.

18. An energy storing device comprising:
a first drum, a second drum and at least one intermediate drum disposed between said first drum and said second drum, axes of said drums being parallel to each other, and said drums being rotatable around the respective axes;
an elastic cord having a first end portion fixed to and wound onto said first drum, a second end portion fixed to and wound onto said second drum, and an intermediate portion wound at least partly around said intermediate drum;
means for connecting said first drum, said second drum, and said at least one intermediate drum so that upon rotation of the drums, the peripheral displacement of said second drum is greater than the peripheral displacement of said intermediate drum and the peripheral displacement of said intermediate drum is greater than the peripheral displacement of said first drum;
wherein said energy storing device further comprises an input-output switching mechanism engageable with at least one of said first, second and intermediate drums, and said connecting means, said mechanism switching said device between an energy storing condition and an energy discharging condition by shifting said mechanism between an energy input position and an energy output position, and
wherein said input-output switching mechanism comprises means for protecting said elastic cord, said protecting means stopping the input of energy to said device and the output of energy from said device by shifting said mechanism to a neutral position when the length of said elastic cord wound onto one of said first drum and said second drum reaches a predetermined small amount.

19. An energy storing device comprising:
a first drum, a second drum and at least one intermediate drum disposed between said first drum and said second drum, axes of said drums being parallel to each other, and said drums being rotatable around the respective axes;
an elastic cord having a first end portion fixed to and wound onto said first drum, a second end portion fixed to and wound onto said second drum, and an intermediate portion wound at least partly around said intermediate drum;
means for connecting said first drum, said second drum, and said at least one intermediate drum so that upon rotation of the drums, the peripheral displacement of said second drum is greater than the peripheral displacement of said intermediate drum and the peripheral displacement of said intermediate drum is greater than the peripheral displacement of said first drum, wherein said energy storing device further comprises an input-output switching mechanism engageable with at least one of said first, second and intermediate drums, and said connecting means, said mechanism switching said device between an energy storing condition and an energy discharging condition by shifting said mechanism between an energy input position and an energy output position, and
wherein said input-output switching mechanism further comprises means for preventing overheating of said elastic cord, said overheat preventing means stopping the input of energy to said device by shifting said mechanism to a neutral position when the temperature of said elastic cord reaches a predetermined high temperature.

20. An energy storing device comprising:
a first drum, a second drum and at least one intermediate drum disposed between said first drum and said second drum, axes of said drums being parallel to each other, and said drums being rotatable around the respective axes;
an elastic cord having a first end portion fixed to and wound onto said first drum, a second end portion fixed to and wound onto said second drum, and an intermediate portion wound at least partly around said intermediate drum;
means for connecting said first drum, said second drum, and said at least one intermediate drum so that upon rotation of the drums, the peripheral displacement of said second drum is greater than the peripheral displacement of said intermediate drum and the peripheral displacement of said intermediate drum is greater than the peripheral displacement of said first drum, and
wherein said energy storing device further comprises a casing which covers all of said drums, and means for delivering cooling air into said casing is connected to said casing.

21. The device of claim 20, wherein the flowing direction of said cooling air in said casing is from one side of said first drum to an opposite side of said second drum.

22. The device of claim 21, wherein an air outlet for said cooling air is provided in said casing at a location near said second drum, and a braking device capable of braking the rotation of said second drum is provided in said air outlet.

* * * * *

UNITED STATES PATENT AND TRADEMARK OFFICE
CERTIFICATE OF CORRECTION

PATENT NO. : 4,762,202
DATED : August 9, 1988
INVENTOR(S) : Masahiro Ogawa et al It is certified that error appears in the above-identified patent and that said Letters Patent is hereby corrected as shown below:

| Column | Line | |
|---|---|---|
| 1 | 36 | after "clutch" insert --7--. |
| 1 | 40 | change "th" to --the--. |
| 6 | 53 | after "..R3+F2" insert --.--. |
| 6 | 59 | after "..R3-R1)/R1)" delete "[19" and insert --.--. |
| 6 | 65 | change "ont" to --onto--. |
| 7 | 30 | change "theorectical" to --theoretical--. |
| 10 | 4 | change "shifing" to --shifting--. |
| 12 | 34 | change "conjunctions" to --conjunction--. |
| 16 | 20 | change "sensing" to --sending-- |

Signed and Sealed this

Third Day of January, 1989

Attest:

DONALD J. QUIGG

Attesting Officer    Commissioner of Patents and Trademarks